July 21, 1959     W. E. COWLEY     2,895,513
WORKHOLDER
Filed April 2, 1956     2 Sheets-Sheet 1
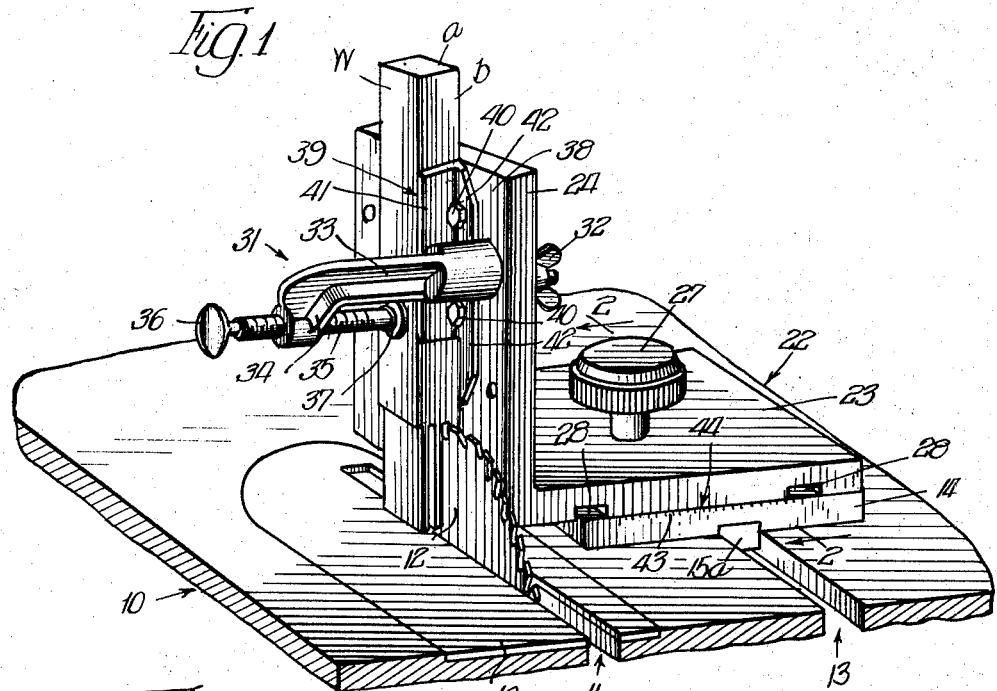
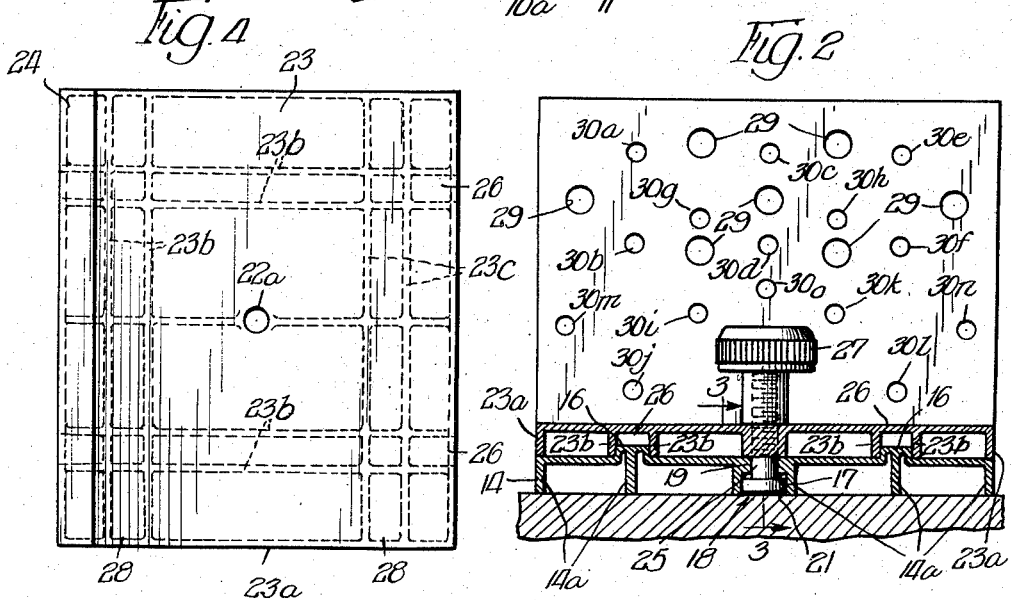
INVENTOR.
William E. Cowley,
BY
Brown, Jackson, Boettcher & Dienner

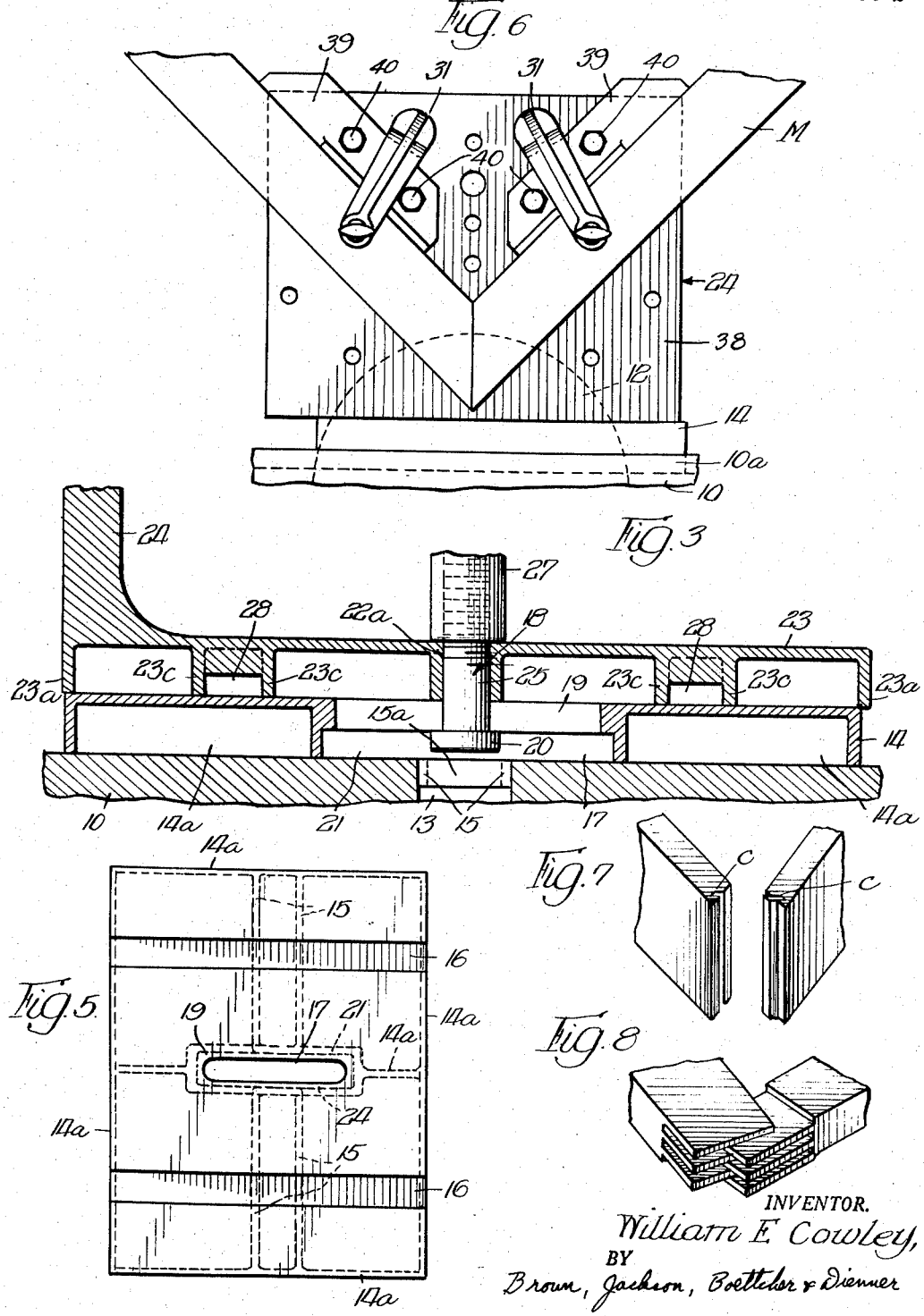

United States Patent Office 2,895,513
Patented July 21, 1959

2,895,513
WORKHOLDER

William E. Cowley, Louisville, Ky., assignor to American Saw and Tool Company, Louisville, Ky., a corporation of Kentucky Application April 2, 1956, Serial No. 575,481

6 Claims. (Cl. 143—52)

This invention relates to work holders for machine tools of the class including saws, shapers and the like.

A principal object of the invention is to provide a workholder that will be useful in properly locating work relative to the cutter in such machine tools so that prescribed cuts may be made therein with a high degree of accuracy and also so that the work may be firmly held in such an adjusted position once it has been properly located.

Thus, it is contemplated that the invention will have particular utility in cutting splines on mating parts or in edge or flat tenoning and like operations where it is desired to mortise two pieces of wood together as in forming a window, a drawer, a picture frame or the like. In using a bench saw for such cutting operations difficulty has been experienced because it is important not only that the cut be made at the proper location and to a predecided angle and depth but it is also important that the cuts in each piece be identical, or at least to a predecided pattern, to insure a proper fitting of the spline or tenon piece. To manually hold the pieces against the cutter or saw blade is at best a difficult and, in many instances, a quite unsatisfactory as well as hazardous operation. Only the most skilled are at all successful. The pieces of work often have to be held in awkward positions, the cut has to be made at a difficult angle to the grain of the wood or the pieces have to be held so close to the cut that there is always the chance, if the work slips, for the workman's hand being drawn across the sawblade.

With the above in mind, it is therefore proposed and it is a principal object of the invention to provide a workholder embodying a base and an L-shaped member mounted thereon, the L-shaped member having an upright portion against which the work may be supported and/or clamped. The base is adapted for mounting on the table of a bench saw or other machine tool for movement across the table in a direction paralleling the line of cut so as to feed the work into the cutter while the L-shaped member is mounted on said base in a manner permitting it to be adjusted in a direction normal to said movement of the base in order to vary the location of the cut in the supported work. It is a feature of the invention that the upright portion of said L-shaped member is provided with a plurality of openings by which one or more abutment members may be removably bolted thereto. These abutment members provide a second surface at right angles to the surface of the upright against which the work may be firmly located and fixed on the workholder during a cutting operation. Because these holes are arranged in a predetermined pattern, the abutment members may be selectively located at different angles and positions relative to the table or saw blade to accommodate the requirements of the particular cutting operation.

It is also a feature of the invention that said L-shaped member may be mounted on its base so that its upright portion may be disposed in either parallel or normal relation with respect to the line of cut, and so further contributing to the universality of the workholder.

Many further objects as well as advantages of the invention will be at once apparent to those skilled in the art and it is to be understood that many changes and modifications will at once suggest themselves and may be made without departing from the spirit of the invention as defined in the appended claims and it is therefore to be understood that the description which follows is not to be taken in a limiting sense but merely as illustrative of the invention.

Now, referring more particularly to the drawings:

Figure 1 is a fragmentary view, in perspective, of a bench saw on which is mounted a workholder according to the present invention;

Figure 2 is a sectional view taken along lines 2—2 in Figure 1 and looking in the direction indicated by the arrows;

Figure 3 is a sectional view taken along lines 3—3 in Figure 2 and looking in the direction indicated by the arrows;

Figure 4 is a top plan view of the angle plate alone;

Figure 5 is a top plan view of the base plate separate from the angle plate of Figure 4 and omitting the connecting bolt;

Figure 6 is a front elevational view of the work holder and illustrating a use thereof different from that illustrated in Figure 1; and Figures 7 and 8 are further examples of work that can be performed on a bench saw utilizing the work holder shown in Figures 1 through 5.

Referring to Figure 1 reference numeral 10 indicates a saw table having a circular saw blade 12 which extends through a slot 11 in a removable table insert 10a and which is operated in conventional manner. Said table 10 also has a mitre slot 13 which is disposed parallel to slot 11. A work holder, particularly adapted for use with a bench saw of this character, according to my invention embodies a base plate 14 which is preferably cast from light metals such as aluminum or zinc and is formed with reinforcing ribs 14a on its underside, although it may be formed of heavier sheet stock and in which case reinforcing ribs 14a could be dispensed with. As seen in Figures 1, 3 and 5 these ribs 14a are arranged about the peripheral edge of the base plate 14 as well as intermediately thereof and are dimensioned so that said base plate 14 will be stable on and have smooth sliding contact with the saw table top 10. Base plate 14 is also provided with two sets of aligned extension portions 15 on its under side which depend somewhat below the ribs 14a and extend into mitre slot 13. Said pairs of extensions 15 are so spaced that they will engage on opposite side walls of the mitre slot 13 but slide freely thereon when the base plate 14 is moved across the saw table in the direction of said slot 13. Thus said extensions 15 together provide a guide which acts in the mitre slot 13 to restrict the movement of the base plate 14 to a direction paralleling the slot 11 or the flat of the saw blade 12. The space between the extensions 15 may be filled in at the ends by a portion 15a, if desired.

On the top surface of said base plate 14 are a pair of raised longitudinal sections or guides 16 disposed in spaced parallel relation and at right angles to the extensions 15. Intermediate these parallel guides 16, base plate 14 is provided with an elongated slot 17 to accommodate a locking bolt 18. Said slot 17 has its longest dimension parallel with the guides 16 and includes an overhanging lip portion 19 which serves to prevent withdrawal of the enlarged head 20 of locking bolt 18. As seen best in Figure 2, slot 17 also has opposed vertically extending parallel side walls 21 of plane shape and the enlarged head 20 of locking bolt 18 is preferably square and dimensioned so that it may freely slide lengthwise of the slot 17 but cannot turn therein. Mounted on base plate 14 is angle plate 22 having base portion 23 and upright portion 24. Its base portion 23 is provided with a central opening 22a through which the stud portion 25 of the aforementioned locking bolt 18 extends. Said angle plate 22 like base plate 14 is also preferably cast of aluminum or zinc or similar light weight but durable material. In casting the angle plate, it is also preferably provided with reinforcing ribs 23a along its peripheral sides. It also has similar ribs 23b intermediately disposed on its underside which are arranged to extend the length of the base portion 23 in a direction normal to the plane of said upright portion 24 and which are spaced apart a distance equal to the spacing of guides 16 on the base plate 14 so as to provide guideways 26 which slidably fit therewith in an adjustment of the angle plate 22 to locate its upright portion 24 closer or further away from the saw blade 12.

The stud portion 25 of said locking bolt 18 is circumferentially threaded so that an enlarged locking nut 27 may be threadedly connected therewith. If desired, the outer surface of nut 27 may be knurled to make it more convenient to grasp and turn. By turning lock nut 27 the head 20 of the locking bolt 18 may be drawn up to tightly engage the underside of the lip portion 19 about slot 17 and so secure the upright portion 24 of the angle plate 22 in a desired adjusted position relative to the saw blade 12. When it is desired to readjust the location of upright portion 24, one merely loosens the locking nut 27 to release head 20 from its binding relation with lip 19 whereupon the said angle plate is free to slide on guides 16 to locate its upright portion 24 at a new position closer to or more remote from the saw blade 12, slideways 26 functioning to assure that said adjustment is exactly normal to the saw blade. Base portion 23 is also provided with two further sets of reinforcing ribs 23c which are disposed at right angles to ribs 23b but are similarly spaced as said ribs 23b to provide a second pair of guideways 28 which are parallel to the upright portion 24 of said angle plate. Thus it is also proposed that stud portion 25 will be of sufficient length as to allow lock nut 27 to be retracted a sufficient distance without disengagement therefrom to permit the angle plate to be lifted to a height where the guideways 26 in its base portion 23 will become disengaged with the guides 16, then turned at right angles and be relocated on base plate 14 with the guideways 28 of its base portion 23 fitting over guides 16. By this means it is possible to arrange the angle plate 22 on the base plate 14 so that its upright portion 24 may be selectively located in either normal or parallel relation with the saw blade 12 whichever proves more convenient in a particular cutting operation. In either arrangement angle plate 22 may be adjusted by means of guideways 24 or 28, as the case may be, along guides 16 to position the upright 26 in a desired spaced position with respect to the saw blade 12 and the locking nut 27 may be subsequently tightened to hold the angle plate in said adjusted relation to the saw blade 12.

Upright portion 24 of the angle plate, as seen in Figure 2, has a plurality of large openings 29 and a plurality of smaller openings which are identified by reference numerals, 30a through 30n. In order to secure the work W in place, the upright portion 24 is provided with at least one clamp member 31 having a threaded portion of reduced section which extends through a selected one of said enlarged openings 29 and receives a wing nut 32 which may be tightened thereon to secure the clamp member 31 to the upright portion 24. As seen in Figure 1, these clamp members 31 include a spacer part 33 and an angled part 34 having a threaded bore in which is threadedly connected an adjustment portion 35 so that it may be advanced, by turning, toward and away from the upright 24. For aid in turning said adjustment portion 34, a handle 36 may be provided. It may also have an enlarged end 37 for engaging the adjacent side of a piece of work W (Figure 1). By providing a number of such openings at different locations on the upright 24, the increased usefulness of the clamp member 31 is obvious.

To further more positively locate and hold the work W in place on the surface 38 of the upright 24, angled abutment members 39 are secured to the upright portion 24 by a pair of bolts 40 extending through a selected pair of the smaller openings identified by reference numbers 30a through 30n. Wing nuts similar to 32 are threadedly connected therewith on the opposite side of upright portion 24 to removably secure said abutment members 39 in place. As seen in Figure 1 said abutment members 39 each have a work engaging surface 41 which is disposed at right angles to its base portion 42 so that when bolted to the work engaging surface 38 of the upright portion 24 it will lie in a plane at right angles to said surface 38. Thus a piece of work W, as illustrated in Figure 1, may be located with its surface a against the surface 38 of the upright portion 26 and its surface b against the surface 41 of the abutment member 39 and secured in said position by clamp 31.

By proper location of the openings 29 and the openings 30a through 30n, it will be at once apparent that the upright 24 can be adapted for supporting work at a number of different positions and angular relationships on the surface 38 of the upright 26. For this reason, openings 30a through 30n have been located in the upright portion 24 and arranged so that they may be considered in pairs separated by common distances equal to the separation of the bolts 40 in the angled abutment member 39, thus permitting surface 41 to be disposed either horizontally, vertically or inclined at some intermediate angle. For example, said surface of the angled abutment member 39 may be located in any one of four vertical positions in accordance with the thickness of work W by using openings 30a and 30b, 30c and 30d, 30e and 30f or 30g and 30i. It may also be inclined at 45° to the left by using pairs of openings 30a and 30g, 30c and 30h, 30g and 30o, 30b and 30i, or 30m and 30j. Also it may be inclined to the right at 45° by using pairs of openings 30o and 30h, 30h and 30e, 30g and 30c or 30l and 30n. By proper location and number of such openings any desired combination of angular inclinations and positions on said upright 24 may be obtained.

Thus it is possible as illustrated in Figure 1 to clamp a piece of work W in a vertical position and by selected adjustment of angle plate 22 toward or away from the saw blade 12, using scale 43 and indicator 44, accurately reproduce any desired number of tenons in two pieces of work so as to make a joint as illustrated in Figure 8. Figure 6 illustrates how, two angularly related pieces, as in a window or picture frame may be cut for joinder by a spline while Figure 8 illustrates still another means of joining two parts by an insert piece. In this latter example cuts C are obtained by angling the saw blade or the table.

The advantages in using the above described work holder for accomplishing any of the illustrated jobs are obvious and the utility of the work holder for countless other jobs will also at once be apparent to those skilled in the trade and accustomed to using bench saws and the like. Furthermore although the discussion above has been described as applied to a bench saw, it will be obvious that the workholder will have utility with other types of cutting machines, among which would be included planers, shapers and the like.

Thus having described my invention, I claim:

1. A workholder for a machine tool having a cutter and a table provided with a guideway, said workholder comprising a base member to slide on said table and including a guide portion on its under side to extend within said guideway to control the direction of said slide, said base member having guide means on its top surface extending in a direction at an angle to the direction of its said guideportion, a second member adapted to slide on said base member and having a pair of normally disposed guideways on its underside to selectively embrace said guide means in slidable relation thereto, said second member having an upright providing a surface against which one side of the work may rest, and an abutment member removably mounted on said upright in normal relation thereto to provide means against which a second side of the work may rest.

2. A workholder according to claim 1 further including clamp means on the upright by which the work may be firmly positioned against the upright and abutment member.

3. A workholder according to claim 1 wherein said upright has means by which said abutment member may be selectively located in a plurality of different locations thereon.

4. A workholder according to claim 1 wherein said upright has means by which said abutment member may be selectively located thereon in a plurality of different angular relations to the table.

5. A workholder for a machine tool having a cutter and a table provided with a guideway, said workholder comprising a base member to slide on said table and having a guide portion on its underside to slidably fit with said guideway to control the direction in which said base member slides, said base member having guide means on its top surface extending in a direction at right angles to the direction of its said guideportion, a second member having an upright portion providing a vertical surface against which work may rest, said second member being adapted to slide on the top surface of said base member and having guideways on its underside extending in directions at right angles to each other to selectively fit in sliding relation with said guide means on the top surface of the base member whereby the second member may be selectively adjusted on said base member with its upright portion either parallel to or at right angles to said guide means, and releasable locking means for arresting said second member in adjusted position on said base member.

6. A workholder according to claim 5 further including an abutment member having a surface against which a second surface of the work may rest, and said upright portion having a plurality of openings therethrough arranged in a pattern whereby said abutment member may be selectively bolted to said upright portion at different locations thereon and in different angular relations.

References Cited in the file of this patent
UNITED STATES PATENTS

| | | |
|---|---|---|
| 101,760 | Neeb | Apr. 12, 1870 |
| 149,654 | Hanna | Apr. 14, 1874 |
| 207,455 | Stout | Aug. 27, 1878 |
| 425,297 | Capron | Apr. 8, 1890 |
| 1,831,124 | Koster | Nov. 10, 1931 |